United States Patent [19]

Sasaki et al.

[11] Patent Number: 4,959,659

[45] Date of Patent: Sep. 25, 1990

[54] COLOR PICTURE FORMING APPARATUS AND METHOD

[75] Inventors: Takashi Sasaki, Tokyo; Nobuaki Sakurada, Yokohama; Hideaki Kawamura, Tokyo, all of Japan

[73] Assignee: Canon Kabushiki Kaisha, Japan

[21] Appl. No.: 212,097

[22] Filed: Jun. 27, 1988

Related U.S. Application Data

[63] Continuation of Ser. No. 896,320, Aug. 13, 1986, abandoned, which is a continuation of Ser. No. 585,303, Mar. 1, 1984, abandoned.

[30] Foreign Application Priority Data

Mar. 8, 1983 [JP] Japan .................................. 58-37698
Apr. 28, 1983 [JP] Japan .................................. 58-75857

[51] Int. Cl.⁵ ........................ E01D 15/16; H04N 1/46
[52] U.S. Cl. ........................................ 346/1.1; 346/46; 346/75; 346/140 R; 358/75
[58] Field of Search ................... 346/1.1, 75, 140 R, 346/46; 358/75, 298, 78; 430/42–44, 293

[56] References Cited

U.S. PATENT DOCUMENTS

| Re. 27,555 | 1/1973 | Loughren | 358/78 |
|---|---|---|---|
| 1,656,338 | 1/1928 | Ranger | |
| 1,790,723 | 2/1931 | Ranger | |
| 1,817,098 | 8/1931 | Ranger | |
| 3,404,221 | 10/1968 | Loughren | 178/5.2 |
| 3,476,874 | 11/1969 | Loughren | 358/75 |
| 3,681,650 | 8/1972 | Koll | 315/30 |
| 3,683,212 | 8/1972 | Zoltan | 310/8.3 |
| 3,747,120 | 7/1973 | Stemme | 346/75 |
| 3,864,696 | 2/1975 | Fischbeck | 346/140 |
| 3,961,306 | 6/1976 | Anstey | 340/15.5 DS |
| 3,977,007 | 8/1976 | Berry et al. | 346/1 |
| 4,050,077 | 9/1977 | Yamada et al. | 346/75 |
| 4,108,654 | 8/1978 | Goren | 96/1.2 |
| 4,178,597 | 12/1979 | Isayama et al. | 346/75 |
| 4,272,771 | 6/1981 | Furukawa | 346/75 |
| 4,300,142 | 11/1981 | Kos | 346/76 |
| 4,313,684 | 2/1982 | Tazaki et al. | 400/322 X |
| 4,314,274 | 2/1982 | Atoji et al. | 358/80 |
| 4,339,774 | 7/1982 | Temple | 358/283 |
| 4,342,051 | 7/1982 | Suzuki et al. | 358/283 |
| 4,353,079 | 10/1982 | Kawanabe | 346/140 |
| 4,365,275 | 12/1982 | Berman | 358/283 |
| 4,368,491 | 1/1983 | Saito | 358/283 |
| 4,389,712 | 6/1983 | Frattarola et al. | 365/127 |
| 4,394,693 | 7/1983 | Shirley | 358/298 |
| 4,403,874 | 9/1983 | Payne et al. | 400/124 |
| 4,412,225 | 10/1983 | Yoshida et al. | 346/1.1 |
| 4,412,226 | 10/1983 | Yoshida | 346/1.1 |
| 4,413,275 | 11/1983 | Horiuchi et al. | 358/75 |
| 4,414,635 | 11/1983 | Gast et al. | 364/526 |
| 4,446,470 | 5/1984 | Sugiyama et al. | 346/140 |
| 4,468,706 | 8/1984 | Cahill | 358/300 |
| 4,488,245 | 12/1984 | Dalke et al. | 364/526 |
| 4,492,965 | 1/1985 | Ohnishi et al. | 346/1.1 |
| 4,494,128 | 1/1985 | Vaught | 346/140 |
| 4,499,479 | 2/1985 | Chee-Shuen Lee et al. | 346/140 |
| 4,533,923 | 8/1985 | Suzuki | 346/1.1 |
| 4,533,928 | 8/1985 | Sugiura et al. | 346/140 |
| 4,549,222 | 10/1985 | Fogaroli et al. | 358/296 |
| 4,559,542 | 12/1985 | Mita | 346/76 |
| 4,560,997 | 12/1985 | Sato et al. | 346/140 |
| 4,580,150 | 4/1986 | Tazaki | 346/140 |
| 4,595,948 | 6/1986 | Itoh et al. | 358/75 |
| 4,604,654 | 8/1986 | Sakurada et al. | 358/298 |
| 4,631,578 | 12/1986 | Sasaki et al. | 358/80 |
| 4,635,078 | 1/1987 | Sakurada et al. | 346/140 |
| 4,672,432 | 6/1987 | Sakurada et al. | 358/75 |

FOREIGN PATENT DOCUMENTS

| 52-11712 | 7/1975 | Japan. | |
| 53-102034 | 9/1978 | Japan. | |
| 57-156264 | 9/1982 | Japan. | 400/126 |
| 58-60878 | 1/1983 | Japan. | |
| 59-41969 | 3/1984 | Japan. | |
| 59-52658 | 3/1984 | Japan. | |
| 2110036A | 6/1983 | United Kingdom. | |

Primary Examiner—Bruce A. Reynolds
Assistant Examiner—Gerald E. Preston
Attorney, Agent, or Firm—Fitzpatrick, Cella, Harper & Scinto

[57] ABSTRACT

A method of and an apparatus for forming a color picture, which can provide sufficiently satisfactory picture quality and which can be made practicable in terms of cost and reliability utilizes colorants having a plurality of different densities with respect to at least one color among yellow, magenta and cyan provided to form a color picture. Assuming that the number of densities of each color of yellow, magenta and cyan is respectively $N_Y$, $N_M$ and $N_C$, the magnitude relation among them is set to be $N_M$, $N_C > N_Y$.

69 Claims, 12 Drawing Sheets

[DOT DIAMETER] YELLOW

[DOT DIAMETER] MAGENTA

[DOT DIAMETER] CYAN

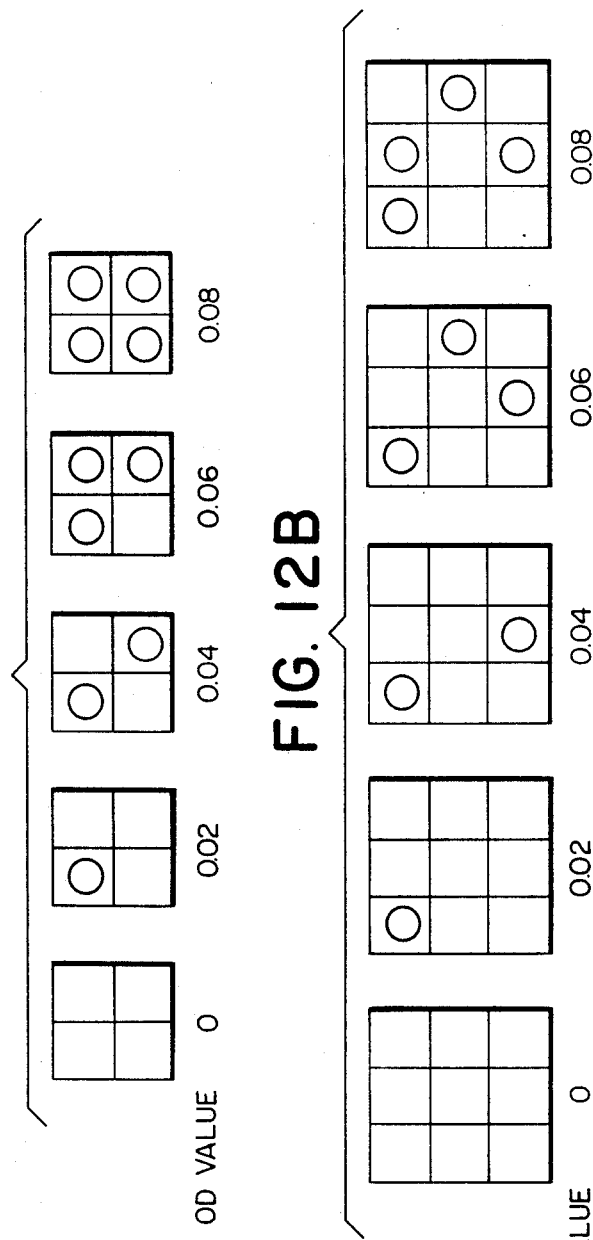
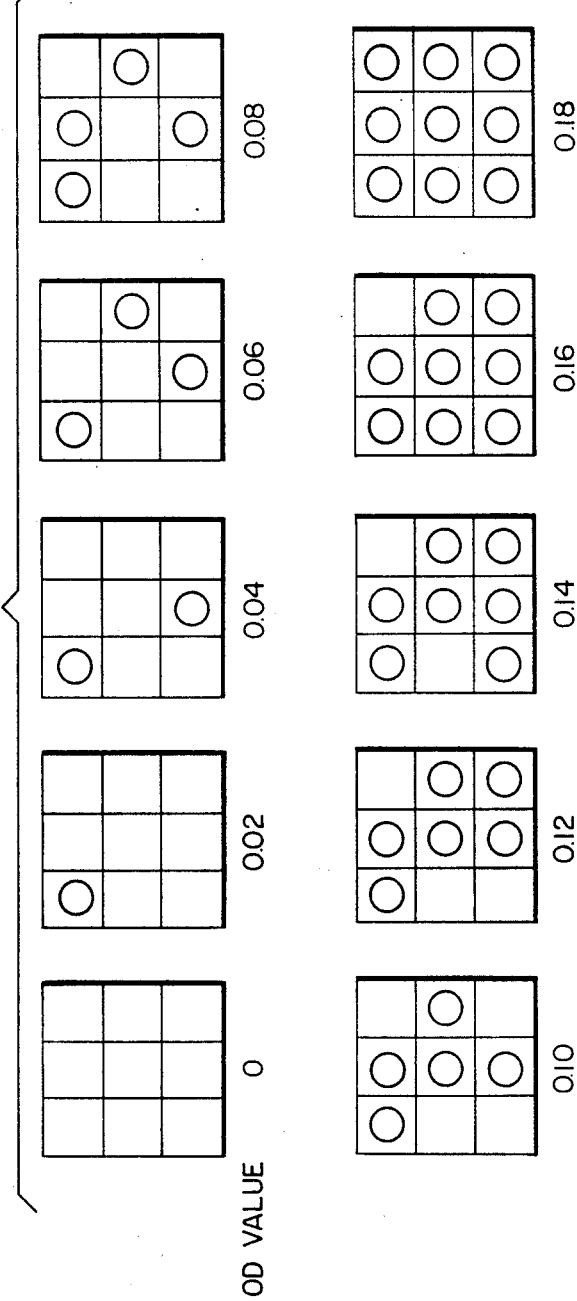
FIG. 12A
FIG. 12B

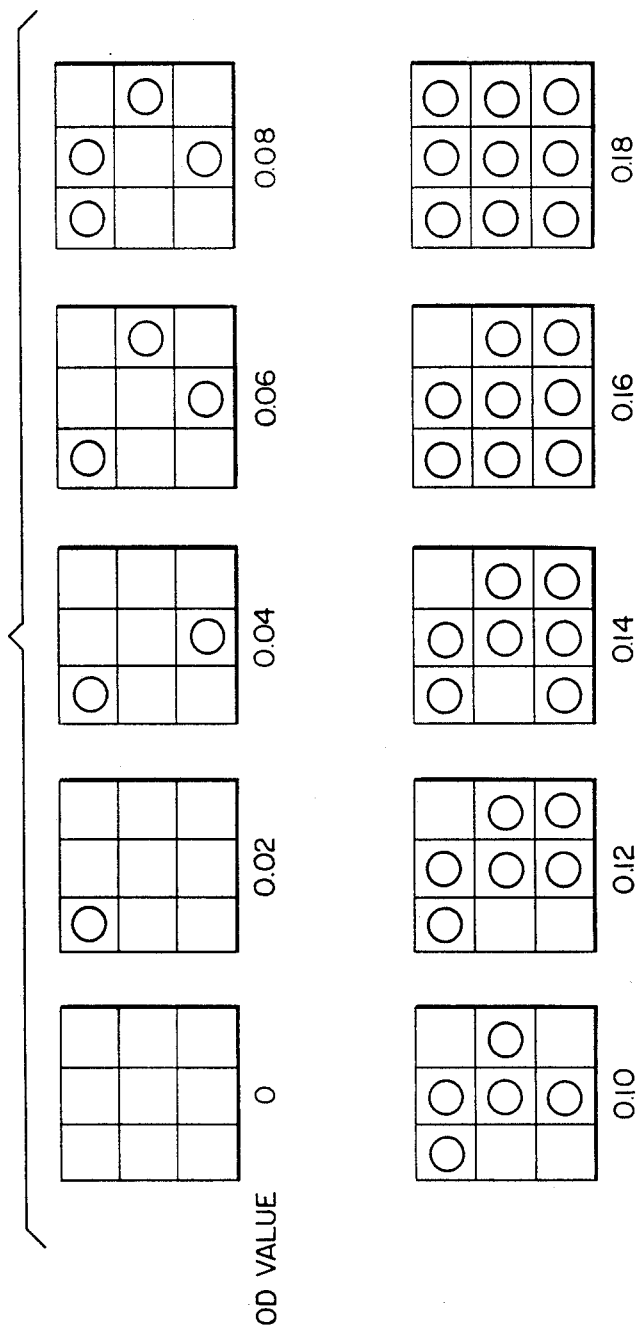
FIG. 12C YELLOW

[DOT DIAMETER]
YELLOW

[DOT DIAMETER]
MAGENTA

[DOT DIAMETER]
CYAN

COLOR PICTURE FORMING APPARATUS AND METHOD

This application is a continuation of application Ser. No. 896,320 filed Aug. 13, 1986, now abandoned, which in turn is a continuation of U.S. Ser. No. 585,303, filed Mar. 1, 1984 now abandoned.

FIELD OF THE INVENTION

The present invention relates to method of and apparatus for forming a color picture using at least cyan, magenta and yellow coloring materials (colorants).

Although the present invention will be described hereinbelow with respect to an ink jet printer as an example, it can be also applied to picture forming apparatuses by way of other methods such as a thermal printing method, an electrophotographic method and the like.

BACKGROUND OF THE INVENTION

Ink jet printers of this kind conventionally use three kinds of inks, cyan, magenta and yellow, and control concentration of each color and a plotting method in accordance with data for every picture element (pixel).

It is necessary to have a wide gradient range with regard to each color of cyan, magenta and yellow in order to obtain good picture quality. For this purpose, there has been proposed a method of using inks having different concentrations for each color. According to such a method, wide range gradient (harmony) as shown in FIG. 1 can be obtained. In FIG. 1, the abscissa indicates the diameter of an ink dot and the ordinate represents an optical reflection density (hereinafter, referred to as an OD value) when an ink dot was formed on a recording paper with a uniform density.

However, this method has such a problem that a pseudo profile occurs at the boundary portion between the thick thin or dark-light inks since the inks of different densities are changed and are used.

Therefore, as shown in FIG. 2, the occurrence of pseudo profile can be prevented by reducing the difference in density between the inks of each density; however, on the contrary the gradient width which can be reproduced becomes narrow.

To solve this problem, if the kinds of ink densities are increased as shown in FIG. 3, a wide gradient can be obtained and pseudo profiles can be prevented. However, in this case, the number of necessary recording heads increases and the number of necessary head drivers increases accordingly, causing the image processing to be complicated and increasing the cost of the apparatus. On the other hand, considering the reliability of the heads, in this kind of method, the occurrence of trouble with any one of the heads will deal a fatal blow to a picture; therefore, it is desirable to make the number of heads as small as possible.

Thus, although it is desirable to use inks having as many different densities as possible to obtain a good picture quality, it is also preferable to reduce the number of inks to be used to as few as possible in terms of the cost of the apparatus and its reliability.

In addition, as shown in FIG. 4, in the case where the boundary portion among thick dots (●) and thin dots (○) exits in the region where the density gradually changes, although the reflection optical densities (OD values) are continuous, the thin dot has a large area and the thick dot has a small area; therefore, a picture at the boundary portion is visually unnatural and the pseudo profile appears. Also, since a thick small dot exerts an intensive stimulus to the eyes, a rough or coarse picture feeling is caused.

On the other hand, as is well known, the resolution power of human eyes differs depending upon colors. The sensitivity for a rough picture feeling due to the difference in dot diameter or due to a small dot of the thick ink as mentioned before also depends upon the resolution power for its color. Namely, the difference in dot diameter and a rough picture feeling are more conspicuous when a color has a higher resolution power. The resolution power for blue is lower than those for green and red and the resolution power for yellow is also lower than those for cyan and magenta since each of cyan, magenta and yellow inks is an ink for controlling red, green and blue. That is, it can be said that the boundary portion of yellow more inconspicuous than the boundary portions of cyan and magenta.

Actually, a pattern has been formed as shown in FIG. 4 with respect to each color of cyan, magenta and yellow. In this case, the concentration to be formed by each ink is adjusted so as to obtain the same OD value for the same dot diameter.

As a result of this, it has been confirmed that a more unnatural feeling is sensed at the boundary portions of magenta and cyan than at the boundary portion of yellow.

In addition, it has been proposed to print a photographic picture using such a printer as mentioned above. As an object to be photographed, scenery, buildings and the like are considered, but in many cases, human pictures are photographed in consideration of a personal use in particular. Therefore, a degree of reproduction of a beautiful flesh (skin) color is an important reference of evaluation when evaluating a printer. Although it is difficult to define a beautiful skin color, we generally feel a beautiful color when the OD value of cyan is much smaller than the OD values of magenta and yellow. In a certain example of measurement, the cyan density was 0.06 as compared with that the densities of magenta and yellow were 0.30 and 0.25, respectively.

In case of expressing such a skin color using a conventional ink jet printer, although the corresponding OD values with regard to magenta and yellow can be actually reproduced, the OD value relating to cyan becomes less than the minimum OD value which can be reproduced. Therefore, in case of expressing a half tone by changing the density modulation i.e., the number of dots to be formed in constant unit area as shown in FIG. 5, a low OD value is seemingly realized by reducing the density of dots.

Therefore, in the case where the minimum OD value of cyan is less than 0.27 as in this example, the apparent OD value of cyan in a skin color is usually adjusted by way of density modulation as shown in FIG. 5, so that the substantial size of one picture element (pixel) of cyan is large. In other words, this results in that the cyan inks are plotted in a few portions corresponding to a skin on an actual picture image, so that picture quality remarkably deteriorates due to this rough picture feeling.

SUMMARY OF THE INVENTION

It is an object of the present invention to provide a method of and an apparatus for forming a color picture which can provide enough satisfactory picture quality and which can be made practicable in terms of the cost and reliability of an apparatus in consideration of the above-mentioned points.

In detail, it is a specific object of the present invention to provide a method of and an apparatus for forming a color picture, in which the number of kinds of densities of a yellow colorant is smaller than those of magenta and cyan.

Another object of the present invention is to provide a method of and an apparatus for forming a color picture having a good reproductivity for a skin color.

A more detailed object of the present invention is to provide a method of and an apparatus for forming a color picture, in which the lowest reflection optical density value which can be expressed by a cyan colorant is set to be smaller than those of magenta and yellow.

The above and other objects, features and advantages of the present invention will be apparent from the following detailed description in conjunction with the accompanying drawings.

BRIEF DESCRIPTION OF THE DRAWINGS

FIGS. 12A, 12B and 12C are diagrams showing dot patterns of each of the cyan, magenta and yellow inks;

DETAILED DESCRIPTION OF THE PREFERRED EMBODIMENTS

Figure 1:
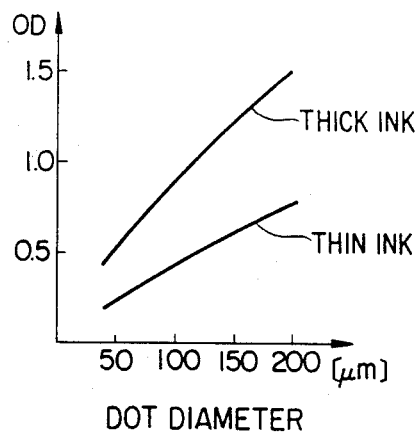
FIGS. 1–3 are diagrams showing the relations between the ink dot diameter and the OD value for each density.
Figure 2:
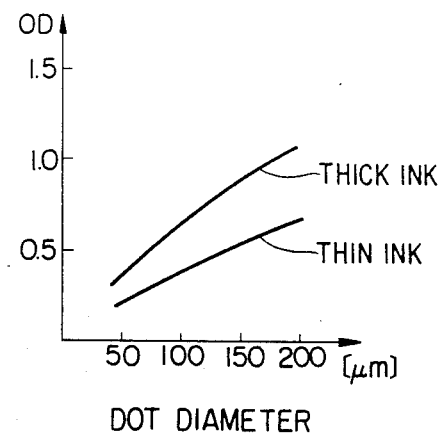
Figure 3:
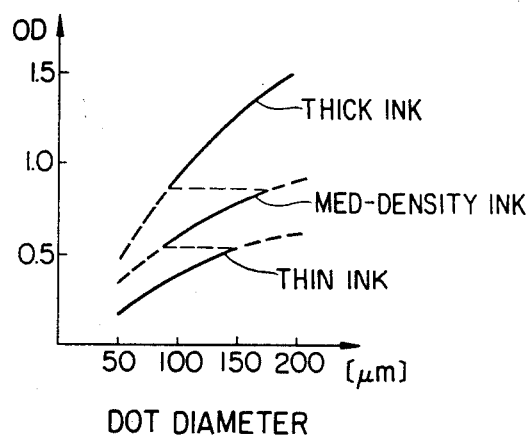
Figure 4:
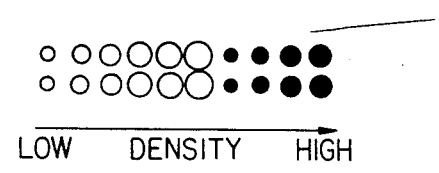
FIG. 4 is a diagram showing a pattern at the boundary portion of the thick dots and the thin dots.
Figure 5:
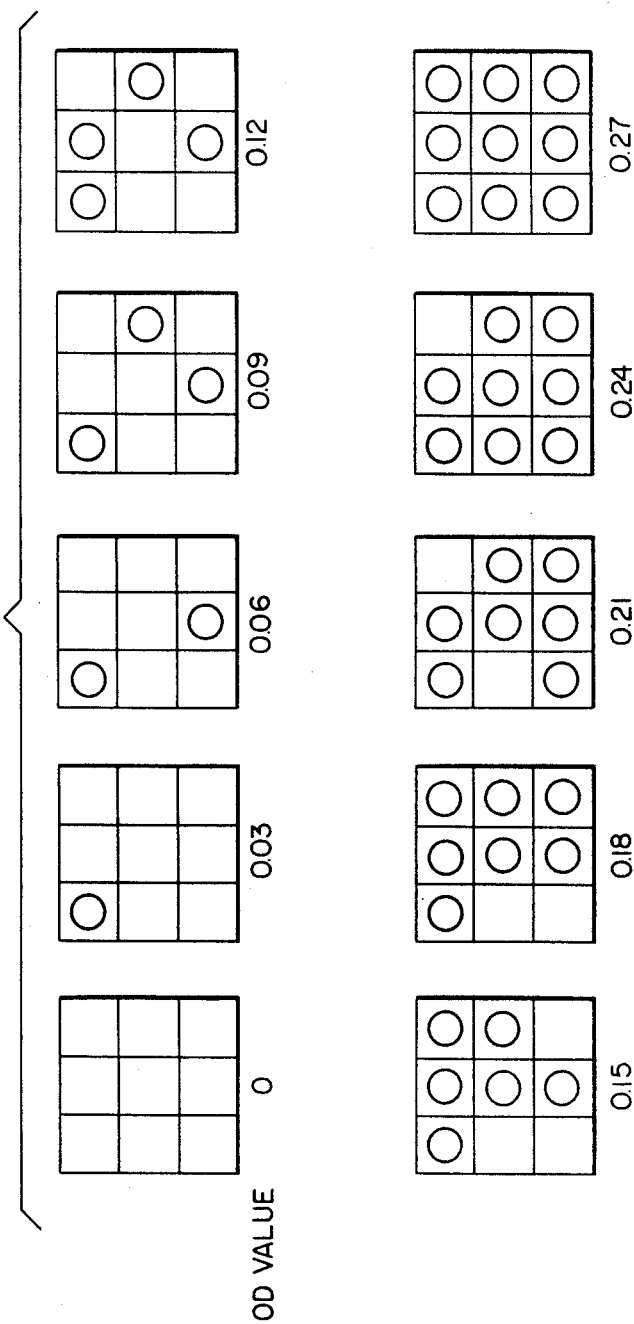
FIG. 5 is a diagram showing dot patterns by the density modulation.
Figure 6:
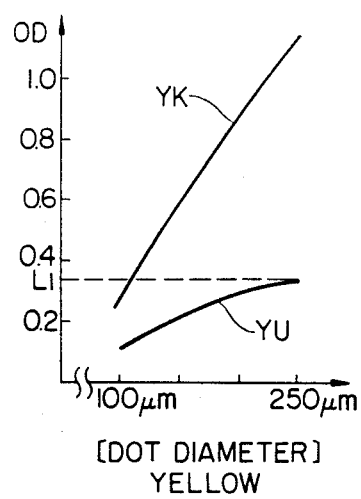
FIGS. 6–8 are diagrams showing the relations between the dot of the inks which were used in a first embodiment and the OD values with respect to each color of yellow, magenta and cyan, respectively.

In the first embodiment of the present invention, inks of two different densities (also referred to as "concentration"). are used for yellow and inks of three different densities are used with respect to magenta and cyan. As for yellow, the ink YU having a dye concentration of 0.5% and the ink YK of the dye concentration of 4% were used and the relation between its dot diameter and the OD value is shown in FIG. 6.

With respect to magenta, the ink MU having a dye concentration of 0.2% and the ink MT of 0.7% and the ink MK of 3% were used. For cyan, the ink CU of a dye concentration of 0.3% and the ink CT of 0.7% and the ink CK of 2.0% were used, respectively. The respective relations among the dot diameter and the OD value were shown in FIGS. 7 and 8. A switching point L1 from YU to YK was set at 0.34 of the OD value; a switching point L2 from MU to MT was set into 0.28, similarly, L3 (from MT to MK)=0.48; L4 (from CU to CT)=0.28; and L5 (from CT to CK)=0.58, respectively.

With such a constitution as described above, the differences in concentration of the inks with respect to cyan and magenta at the switching points become small, so that the occurrence of the pseudo profile is suppressed. Furthermore, since small thick dots are not used, a rough or coarse picture feeling and the like to be sensed from a picture image are eliminated. In addition, with regard to yellow, even if there is a certain degree of difference in concentration, it is inconspicuous.

Figure 9:
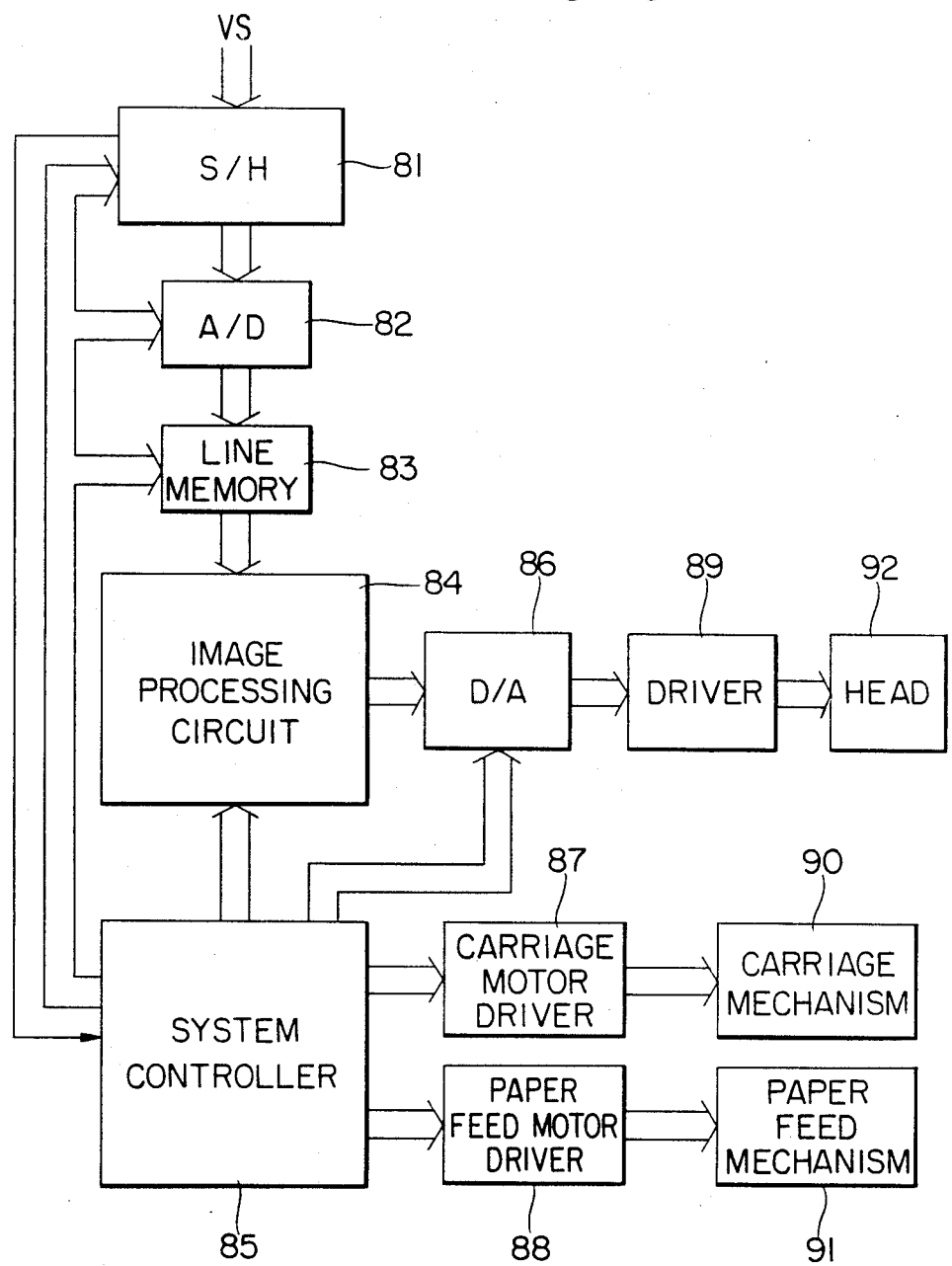
FIG. 9 shows a control circuit diagram of an ink jet printer of the first embodiment.

FIG. 9 shows a control block diagram of an ink jet recording apparatus to realize the present embodiment. A video signal VS including respective chrominance signals of R, G and B and a sync signal is sampled by a sample and hold circuit 81 in response to a sample signal to be obtained from the sync signal for every chrominance signal and is outputted to an A/D converter 82. The A/D converter 82 converts the respective chrominance signals of R, G and B into the digital signals representative of the gradient. The digital signals thus obtained are stored by an amount corresponding to a predetermined number of lines.

The data in a line memory 83 is converted into the digital signal for driving each ink jet head by an image processing circuit 84 which will be described later in detail. This digital signal is converted into the analog signal by a D/A converter 86, thereby driving each ink jet head 92 through a driver 89.

In this embodiment, the head 92 is constituted by individual heads for the respective inks of the yellow thick ink YK, yellow thin ink YU, and the magenta and cyan inks, MU, MT, MK, CU, CT and CK. If black is expressed using Y, M and C, the inks will blot and pure black cannot be expressed; therefore, the head 92 is further provided with a head for black ink. An such as ink jet head, there is used a head using a piezo-electric element whereby a quantity of the ink to be discharged changes in accordance with the voltage to be applied. For example, such a head as disclosed in Japanese Patent Application Laid-Open Publication No. 39495/1976 is useful.

On the other hand, a head drive signal, a carriage motor drive signal, and a paper feed signal are generated at a timing corresponding to the input video signal by a system controller 85 for controlling the sequence of the printers. These signals are supplied to the head driver 89, a carriage motor driver 87, and a paper feed motor driver 88, respectively. Thus, the ink jet head 92 and a carriage motor and its mechanism 90, and a paper feed motor and its mechanism 91 are controlled at a predetermined timing, thereby printing a reproduction picture corresponding to the input video signal on a recording medium.

Figure 10:
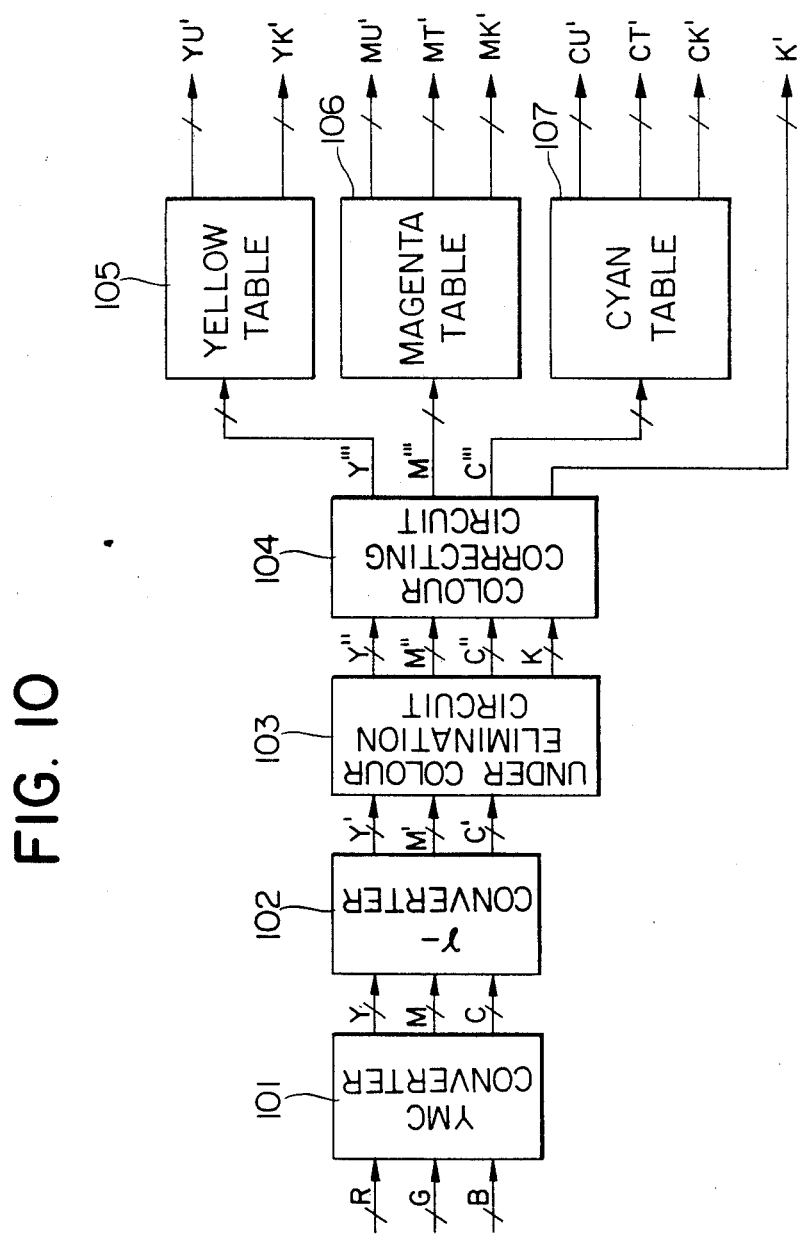
FIG. 10 shows a block diagram of an image processing circuit 84 of FIG. 9.

The operation of the image processing section 84 of FIG. 9 will now be described using FIG. 10. The digital signal of each color from the line memory 83 is converted into the density data of YMC by a YMC converter 101 and is further γ-converted by a γ-converter 102. The common component of YMC, namely, a colorless component K is obtained by an under-color elimination circuit 103, so that the colorless component is subtracted from YMC. Then, the masking processing is carried out by a color correction circuit 104, thereby to eliminate the influence due to the blotted component of the inks.

The digital value of yellow is inputted to a yellow reference table 105. The table 105 serves to discriminate which kind of inks between the thin ink and the thick ink is used in accordance with the input digital value and at the same time it outputs digital signals YU' and YK' each representing the voltage value to be applied to each ink head. Similarly, a magenta reference table 106 outputs MU', MT' and MK' and a cyan reference table 107 outputs CU', CT' and CK'. In addition, a colorless component signal K' is outputted as it is through the D/A converter 86 to the driver for the black head. Likewise, the other digital signals are also outputted through the D/A converter 86 to the drivers for the respective heads.

Figure 7:
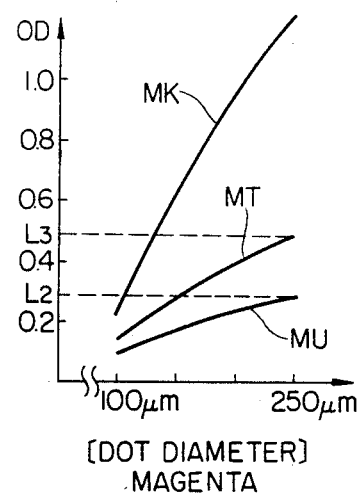
Figure 8:
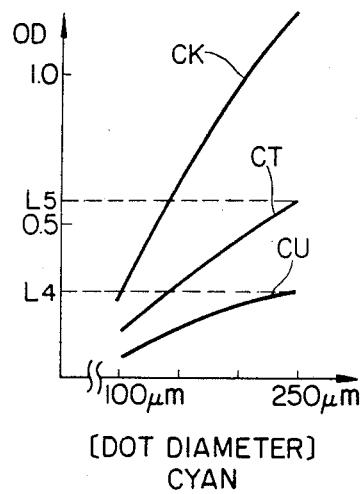

As described above, according to this embodiment, since the inks having many different densities are used with respect to magenta and cyan, each of which has a high sensitivity for human eyes, the occurrence of the pseudo profile due to the difference in concentration can be prevented. At the same time, the minimum dot diameter of the thickest ink of each color of magenta and cyan is larger than that of yellow as shown in FIGS. 6-8. Therefore, the rough picture feeling to be generally caused when the small dots of the thick ink were used is also improved.

In addition, as another embodiment, a method of using the yellow ink of one kind of density and the magenta and cyan inks each having three kinds of different densities is also considered.

Moreover, although the present embodiment has been described with respect to an example of the printer of the type whereby the gradient and color are reproduced by modulating the size of the dot, the present invention can be also applied to a printer which can control the coloring area which occupies a portion in a predetermined area, i.e., to a printer of the type which performs the density modulation such as a dither method or a mesh-point method or the like.

As described above in this embodiment, in the case where three colors of yellow, magenta and cyan are used and the colorants having different densities are used with respect to at least one color among the above-mentioned three colors, when the number of of densities each color of yellow, magenta and cyan is respectively $N_Y$, $N_M$ and $N_C$, their magnitude relation was set into such a relation as $N_M$, $N_C > N_Y$; therefore, it is possible to prevent the occurrence of the pseudo profiles at the boundary portions of the thick and thin colorants for magenta and cyan each having a high resolution power for the human eyes in particular. Furthermore, since the number of kinds of yellow colorants is set to be smaller than those of cyan and magenta, the total number of kinds of whole colorant is also limited. For example, when the ink jet heads are used, the number of heads is also limited, causing the overall apparatus to be simplified and this results in improvement in reliability and a reduction of the cost, and the like. In addition, in case of applying the present invention to a printer of the type which reproduces the gradient by modulating the size of the dot, the smallest dot diameter of each of the thick colorants of cyan and magenta is also set to be larger than that of yellow, so that the rough picture feeling to be generally caused for the human eyes in the case where the small dots of thick colorants were used is also improved.

Next, a second embodiment which can provide good reproductivity of skin color will be described.

Figure 11:
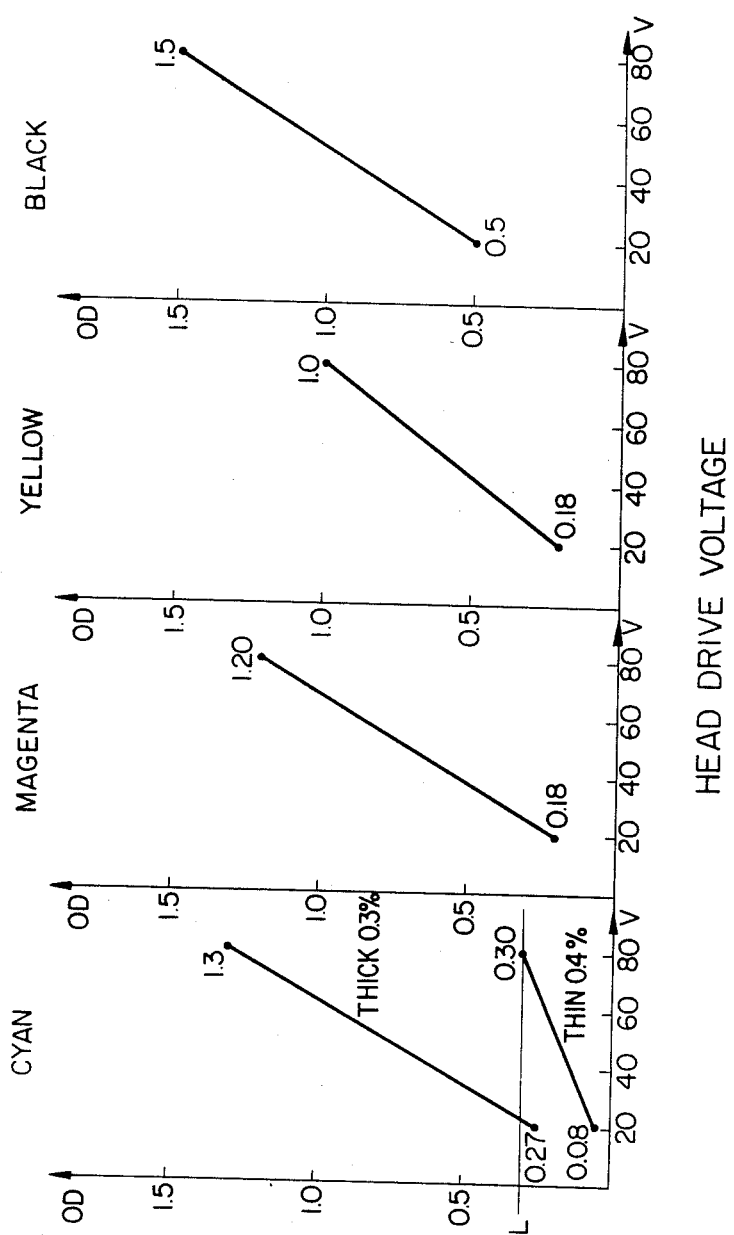
FIG. 11 is a diagram showing the relations among the OD values of the cyan, magenta, yellow, and black inks which were used in a second embodiment and the head drive voltages.

FIG. 11 shows the relations between the OD values (reflection optical densities) of the cyan, magenta, yellow, and black inks which were used in the second embodiment and the head drive voltages.

As shown here, magenta, yellow and black inks each having one concentration were used, while cyan inks having two dye concentrations of 3% and 0.4% were used; thus, the lowest OD value was 0.08. Therefore, it will be appreciated that it is possible to newly reproduce by one dot per one pixel a range of 0.08–0.27 in the range of not larger than 0.27 (OD value) where the reproduction has been conventionally performed depending upon the density modulation.

On other hand, the cyan inks having two densities are used, so that it is possible to plot the cyan ink by dividing the ink plot into two steps; i.e., when the OD value of cyan is larger than a threshold L, the thick ink is used and when it is smaller than L, the thin ink is used. In this case, it is set that L=0.30. Furthermore, with respect to the range corresponding to 0–0.08 of cyan, by performing the density modulation by the dither of 2×2 as shown in FIG. 12A, the lowest OD value is decreased to be as small as 0.08, so that a rough picture feeling is hardly conspicuous. In addition, since the lowest OD values of magenta and yellow are 0.18, the range from 0 to 0.18 is expressed using the dither matrix of 3×3. On one hand, since black expresses the high density section, only a range over a certain OD value is used, so that it is not particularly necessary to perform the density modulation with regard to the range below the lowest OD value.

Figure 13:
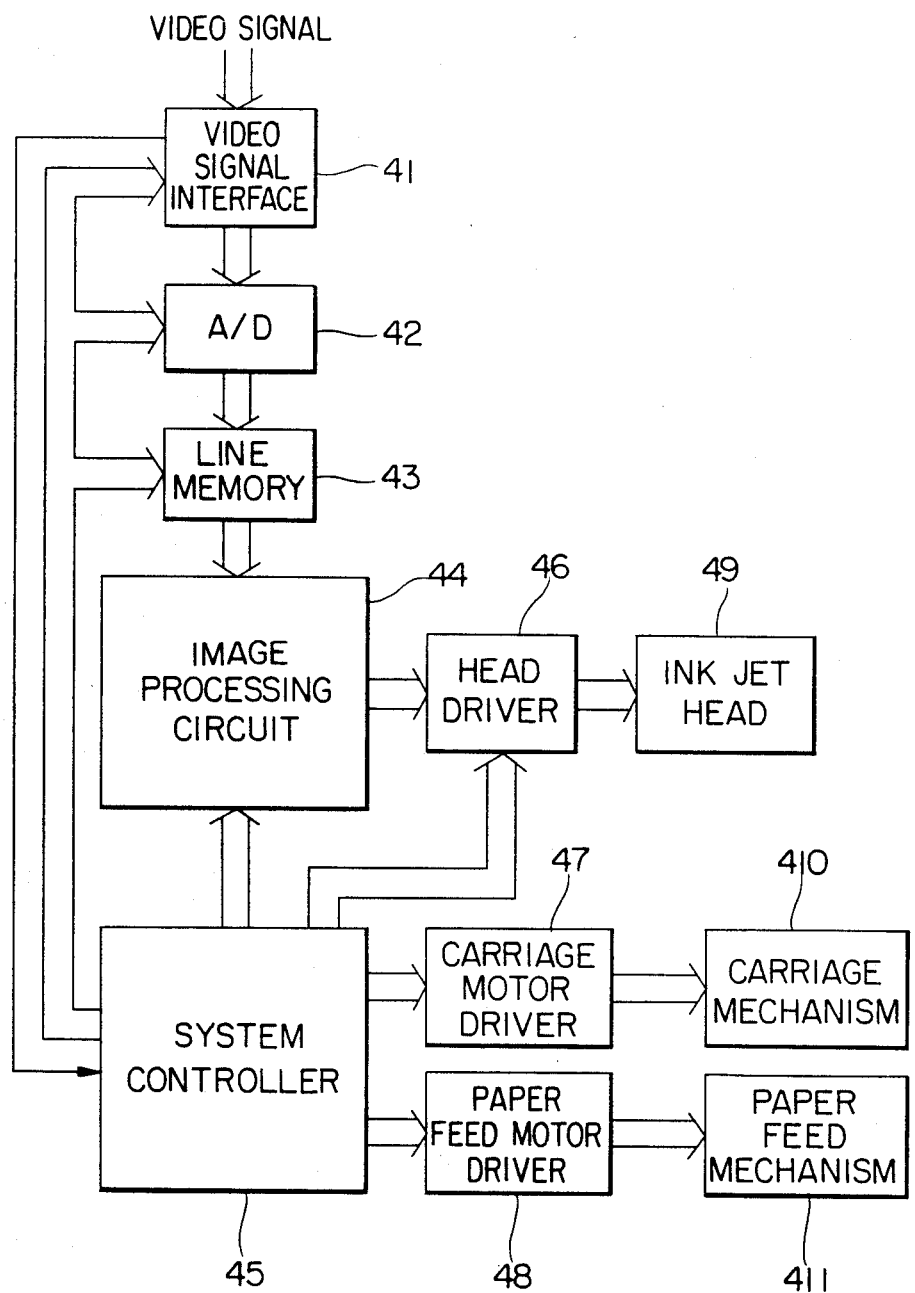
FIG. 13 is a control block diagram of the ink jet printer.

FIGS. 12A, 12B and 12C show how to reproduce a color in the range below each of the lowest OD values of cyan, magenta and yellow, respectively. With respect to the range over the lowest OD values, a color is expressed by the modulation of dot diameter as shown in the first embodiment. FIG. 13 shows a control block diagram of the ink jet printer of the second embodiment.

A composite video signal including a video signal of a projection image, for example, respective chrominance signals of R, G and B and a sync signal is inputted to a video signal interface 41. The signal is synchronized here and is then sampled and held by a sample and hold circuit. This signal is introduced to an A/D converter 42 at the next stage, so that the gradient signals of the image signals R, G and B are converted into the digital signals. These digital signals are stored in a next line memory 43 by an amount corresponding to a proper number of lines. Although the above-mentioned lines are generally set in the vertical direction, it is obviously possible to set them in the horizontal direction. Next, the data in this line memory is subjected to processings such as color conversion, γ-conversion, masking processing, under-color elimination, etc. for every pixel by an image processing circuit 44 and is generally converted into the cyan, magenta, yellow and black signals. These signals are further converted into the voltage values to be applied to each head and are inputted to a head driver 46.

An ink jet head 49 discharges a quantity of each ink corresponding to its applied voltage, so that the hue and concentration are expressed depending upon the quantity of ink of each color.

A head drive signal, a carriage motor drive signal and a paper feed signal are generated at a timing corresponding to the input image signal by a system controller 45 for controlling the sequence of a printer. These signals are supplied to the head driver 46, a carriage motor driver 47, and a paper feed motor driver 48, respectively. Thus, the ink jet head 49, a carriage motor and its mechanism 410, and a paper feed motor and its mechanism 411 are controlled at a predetermined timing, thereby printing a reproduction picture of the input video signal on a recording medium.

Figure 14:
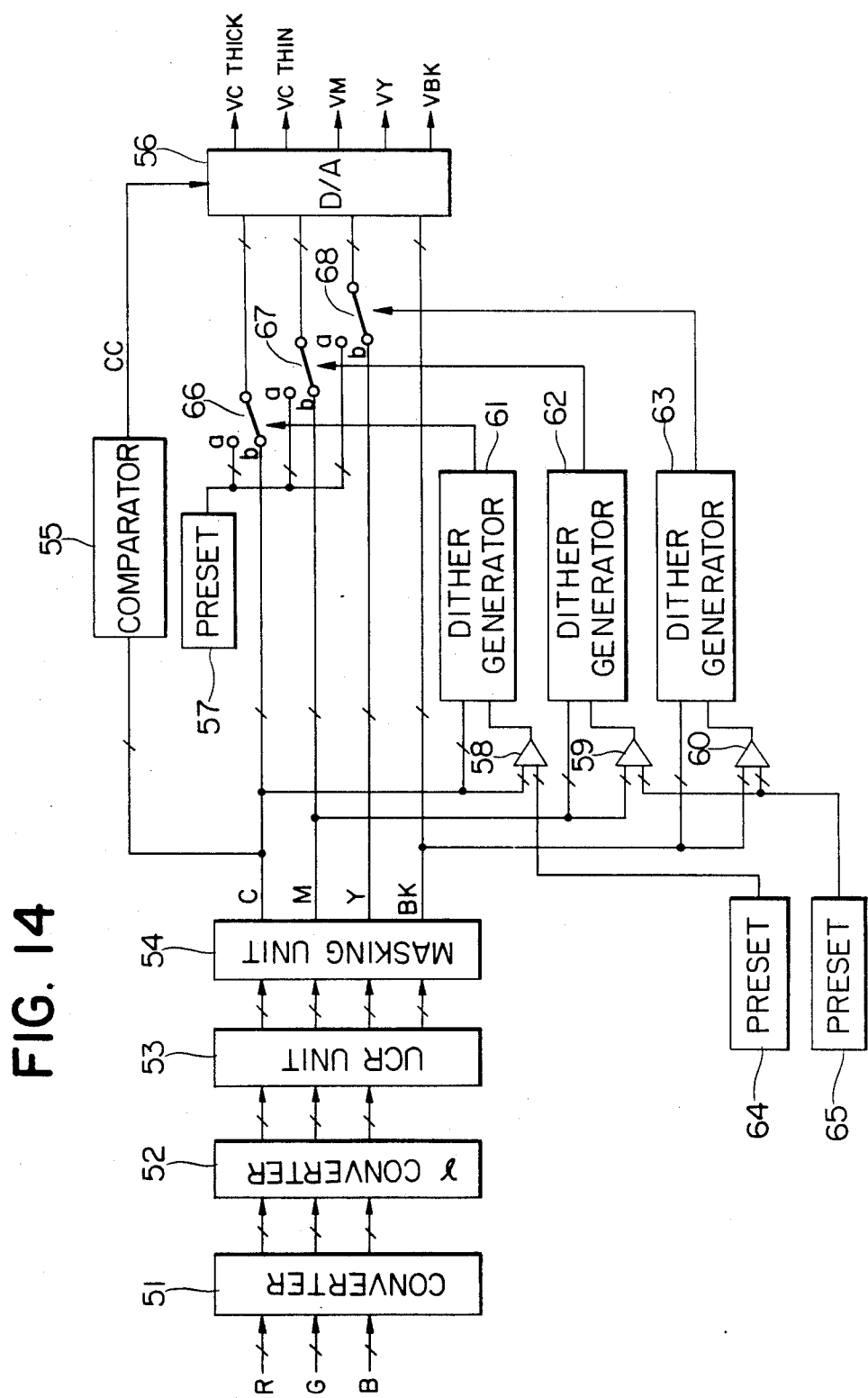
FIG. 14 is a detailed block diagram of an image processing circuit 44 of FIG. 13.

FIG. 14 shows a block diagram of the image processing circuit 44. The R, G and B color resolution signals corresponding to a certain pixel are converted into CMY by a CMY converter 51 and are $\gamma$-converted by a $\gamma$-converter 52.

Next, the black component is detected from C, M and Y in a UCR circuit 53, thereby determining BK. Only in the case where BK is not smaller than a certain value, BK is outputted and BK is subtracted from C, M and Y by only the amount corresponding to it, thereby to obtain C, M and Y. Thereafter, the color correction is done in a masking unit 54. A magnitude of the density C of cyan is discriminated by a comparator 55 whether it is larger or smaller than the threshold L at which value the thick ink and the thin ink are switched. When the density is smaller than the threshold L, a cyan control signal CC at high level "H" is outputted.

On the other hand, the cyan density C is inputted to a dither generator 61 and to a comparator 58. The comparator 58 compares this density C with an output of a preset circuit 64 and when the output of the preset circuit 64 is larger than it, the dither generator 61 is enabled. Similarly, the same operations are performed with respect to a magenta density signal M and a yellow density signal Y.

The output levels of preset circuits 64 and 65 equivalently correspond to the lowest OD value when one pixel was reproduced by one dot.

Consequently, the digital output level of the preset circuit 64 equals the lowest OD value of 0.08 of cyan, while the digital output level of the circuit 65 equals the lowest OD value of 0.18 of magenta and yellow. In the case where C, M and Y are lower than the respective lowest OD values $L_C$, $L_M$ and $L_Y$, each value of C, M and Y is compared with the value of each cell in the dither matrix of each dither generator. When the values of C, M and Y are larger, the terminals of switches 66, 67 and 68 are connected to the sides of a, respectively. On the contrary, if they are smaller, the terminals are connected to the sides of b, respectively. When the connections were made to the sides of a, an output voltage of a preset circuit 57, i.e., a digital value corresponding to that the minimum dot of each ink is expressed is transmitted to a D/A converter 56, so that the lowest OD values are expressed on a recording paper, respectively. On the other hand, when the connections were made to the sides of b, the respective values of C, M and Y are transmitted directly to the D/A converter 56. However, these values of C, M and Y when the switches were connected to the sides of b are certainly the values which are insufficient to express the minimum dots, so that they are not recorded on a recording paper.

In addition, in the case where each comparator 58, 59 and 60 determined that each value of C, M and Y is larger than the digital value corresponding to each lowest OD value, each dither generator 61, 62 and 63 is disenabled, so that the switches 66, 67 and 68 are connected to the terminals on the sides of b.

At this time, since the values of C, M and Y are larger than the digital values corresponding to the lowest OD values, the D/A converter 56 outputs the analog voltages corresponding to the values of C, M and Y to the head driver 46, so that the dots of the sizes responsive to the values of C, M and Y are formed one by one in one pixel. Since two kinds of heads for discharging the thick and thin cyan inks are now provided, the head for the thin ink is selected when the cyan control signal is at "H", while the head for the thick ink is selected when it is at "L".

The lowest OD value mentioned here denotes the minimum value among the OD values which will be realized when one dot was plotted in each pixel but does not include the OD value which will be realized using the density modulation by way of such as a dither method of a density pattern method, etc.

The components of the dither matrix are selected by the main scanning direction address X and the sub-scanning direction address Y.

Figure 15:
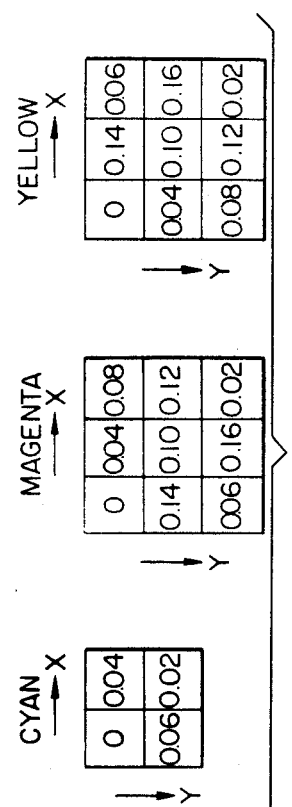
FIG. 15 is a diagram showing a dither matrix of each ink.

That is to say, since the dither matrix of $3 \times 3$ is used for each of magenta and yellow, the comparison thresholds of the address (X, Y) will be expressed by $M_M$ ($mod_3X$, $mod_3Y$) and $M_Y$($mod_3X$, $mod_3Y$) with respect to the respective matrices $M_M$ and $M_Y$. Since the dither matrix $M_C$ of $2 \times 2$ is used for cyan, the comparison threshold will be represented by $M_C$($mod_2X$, $mod_2Y$). FIG. 15 shows the dither matrices for cyan, magenta and yellow which were used.

Although the invention has been accomplished by way of the hardware circuit in this embodiment, it is also possible to realize the invention by way of a software using a computer. In addition, the invention can be also realized using the table in which the output digital data of YMC has been stored for the digital inputs of RGB. As values in table, the values which were obtained by simulation using the circuit of the present embodiment may be stored.

Figure 16:
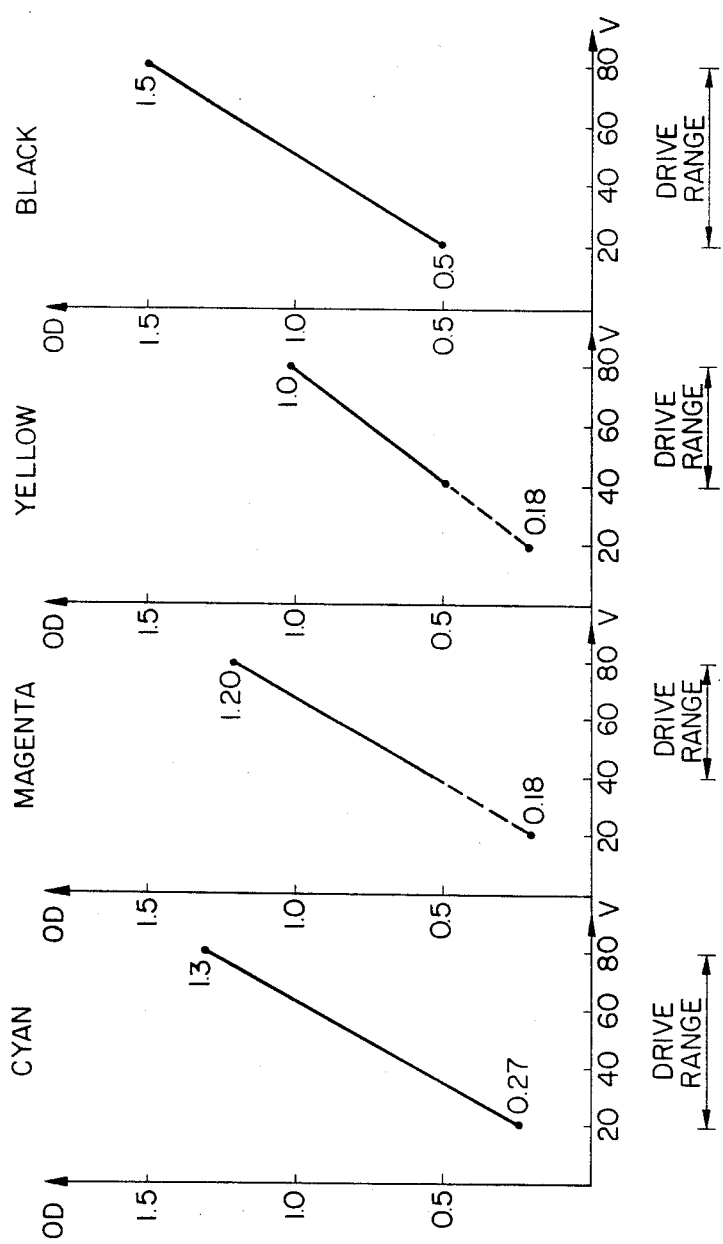
FIG. 16 is a diagram showing the relations between the ink densities and the head drive voltages of another embodiment.

On the other hand, the lowest OD value of the cyan ink has been set to be lower than those of the other magenta and yellow inks by using the thin-density ink with respect to the cyan ink in this embodiment; however, as shown in FIG. 16, it is also possible to realize the invention by setting the lowest drive voltages of the heads for the magenta and yellow inks to be higher than the lowest drive voltage of the head for the cyan ink. The invention can be also realized by setting the exhaust orifice bore of the cyan ink head to be smaller than those of the other heads.

Furthermore, as for the cyan ink, one kind of ink having a lower dye concentration than those of the yellow and magenta inks may be used without using two kinds of thick and thin inks.

In addition, although the present embodiment has been described with respect to an example of the ink jet printer, the present invention can be also applied to electrophotographic printers by making a concentration of a cyan toner thin or reducing a diameter of an optical beam to form cyan. On one hand, in thermal printers, the invention can be realized by making a concentration of a cyan ink ribbon which is thinner than concentrations of other ink ribbons.

As described above the invention can be applied to any printers which can control the density of one dot.

According to the present invention, since the lowest OD value of cyan has been set into a low value, the cyan component in a skin color can be expressed without diminishing the resolution power thereof, thereby enabling a picture forming apparatus which can reproduce a good skin color to be realized. Therefore, it is possible to perform the picture reproduction which is suitable for reproduction of a human picture.

Figure 17A:
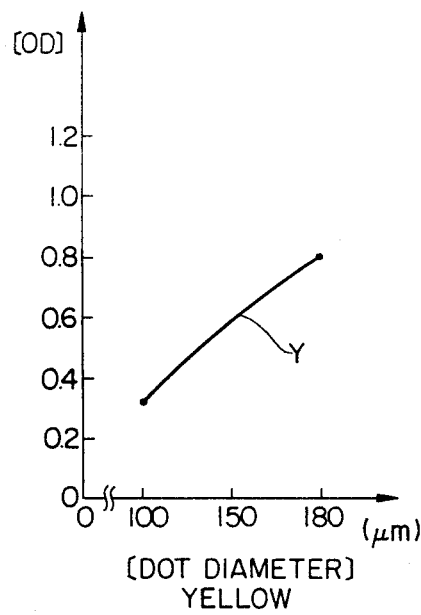
FIGS. 17A, 17B and 17C are diagrams showing the relation between the dot diameters of the respective yellow, magenta and cyan inks which were used in a third embodiment and the OD values.
Figure 17B:
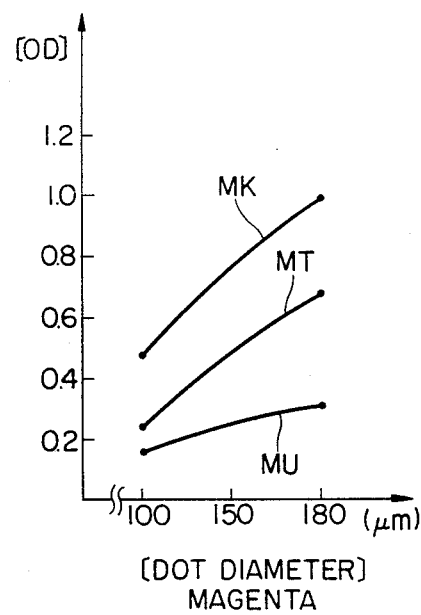
Figure 17C:
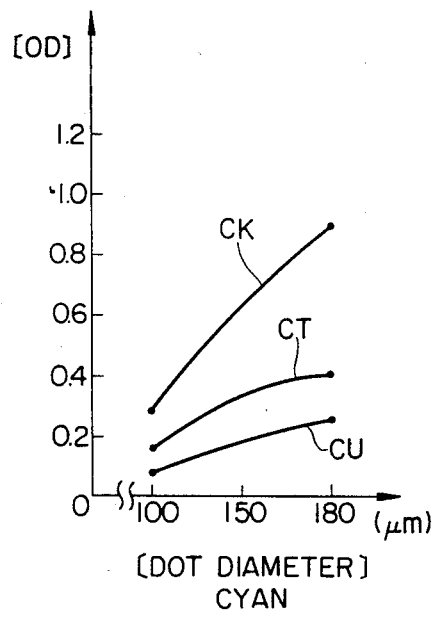

In addition, FIG. 17 shows a third embodiment of the present invention. In this embodiment, the first and second embodiments are combined. FIGS. 17A, 17B and 17C respectively show ranges of the OD values which can be reproduced to dot diameters of the inks to be used for yellow, magenta and cyan. Every dot diameter is set into 100 μm for the lowest OD value, while it is set into 180 μm for the highest OD value. Each axis of ordinate shows the OD value when dots were formed uniformly in the transverse and longitudinal directions at an interval of 150 μm. Namely, the yellow ink Y reproduces a range of OD values of 0.32–0.80; the low-density magenta ink reproduces a range of OD values of 0.16–0.32; the medium density (med-density) magenta ink reproduces a range of 0.24–0.64; and the high-density magenta ink reproduces a range of OD values of 0.48–1.0. The low-density cyan ink CU reproduces a range of OD values of 0.08–0.24; the med-density cyan ink CT reproduces a range of OD values of 0.16–0.40; and the high-density cyan ink CK reproduces a range of OD values of 0.28–0.90.

In this way, since the densities of the yellow ink were set to be smaller than those of magenta and cyan and the lowest OD value of cyan was set to be lower than those of yellow and magenta, the number of colorants can be limited and at the same time, reproductivity of a skin color is extremely improved. In addition, the system controllers shown in the first and second embodiments which have been previously shown can be applied to a controller of the third embodiment.

Moreover, since yellow ink having one density is used in the third embodiment, the number of recording heads can be further decreased. On the other hand, in the case where the lowest OD values of cyan, magenta and yellow are set into $ML_C$, $ML_M$ and $ML_Y$, it is most desirable to set them into $$ML_C < ML_M < ML_Y$$

since cyan is most conspicuous and yellow is most inconspicuous.

As described in the above first to third embodiments, according to the present invention, it is possible to provide a color picture with high picture quality by a low-cost apparatus. In addition, an apparatus having good reproductivity of a skin color can be also provided.

In addition, the present invention is not limited to the above-described embodiments but various changes and modifications are possible within the spirit and scope of the claim of the invention.

What we claim is:

1. Color picture forming method for reproducing an original color image, the method comprising the steps of:

providing recording materials at least of yellow, magenta and cyan, wherein at least the magenta and cyan recording materials have a plurality of different concentrations, which recording materials enable representation of substantially all of the optical density gradations in the original color image;

depositing the recording materials to provide a plurality of dots of different sizes on a recording medium; and forming a color picture from the dots of different sizes and recording materials by selecting the recording materials, size and location of each dot to provide a plurality of areas on the recording medium having optical densities in accordance with the optical densities of corresponding areas of the original color image;

wherein, if the numbers of different recording material concentrations for yellow, magenta and cyan are respectively $N_Y$, $N_M$ and $N_C$, the relation among said numbers is $N_M, N_C > N_Y$.

2. Color picture forming method according to claim 1, wherein the optical density ranges reproducible using different dot sizes of said plural recording materials in at least one or magenta and cyan overlap each other.

3. Color picture forming method according to claim 1, wherein the lowest optical density capable of being reproduced using cyan is smaller than the lowest optical densities capable of being reproduced using of magenta and yellow.

4. Color picture forming method according to claim 3, wherein, if the respective lowest optical densities capable of being reproduced by cyan, magenta and yellow are $ML_C$, $ML_M$ and $ML_Y$, the relation among said optical densities is $ML_C < ML_M < ML_Y$.

5. Color picture forming method according to claim 1, wherein the minimum dot size for each color is the minimum dot size capable of being provided in that color.

6. Color picture forming method according to claim 5, further including a density modulation step controlling the number of colors having the minimum dot size in any particular area of the picture.

7. Color picture forming method according to claim 6, wherein said density modulation step uses a dither method.

8. Color picture forming method according to claim 1, wherein said color picture is formed using ink jet heads.

9. Color picture forming method according to claim 8, wherein said ink jet heads can control the sizes of the droplets to be discharged therefrom.

10. Color picture forming method for reproducing an original color image, the method comprising the steps of:

providing recording material at least of yellow, magenta and cyan, wherein at least the magenta and cyan recording materials have a plurality of different concentrations;

depositing the recording materials to provide a plurality of dots of different sizes on a recording medium, wherein the dot sizes and recording materials enable representation of substantially all of the optical density gradations in the original color image; and forming a color picture from the dots of different sizes and recording materials by selecting the recording material, size and location of each dot to provide a plurality of areas on the recording medium having optical densities in accordance with the optical densities of corresponding areas of the original color image, wherein, if the optical densities capable of being expressed by said yellow, magenta and cyan recording materials using the minimum dot sizes thereof are respectively $L_Y$, $L_M$ and $L_C$, the relation among said optical densities is $L_C < L_Y$.

11. Color picture forming method according to claim 10, wherein the relation among said optical densities $L_C$, $L_M$ and $L_Y$ is $L_C < L_M < L_Y$.

12. Color picture forming method according to claim 10, wherein the optical density ranges reproducible using different dot sizes of at least one recording material provided in a plurality of different concentrations overlap each other.

13. Color picture forming method according to claim 10, further including a density modulation step controlling the number of recording materials in any particular area of the picture to provide optical densities not larger than $L_Y$, $L_M$ and $L_C$ in such area.

14. Color picture forming method according to claim 13, wherein said density modulation step uses a dither method.

15. Color picture forming method according to claim 10, wherein, if the numbers of different recording materials concentrations of cyan, magenta and yellow respectively are $N_C$, $N_M$ and $N_Y$, the relation among said numbers is $N_C$, $N_M > N_Y$.

16. Color picture forming method according to claim 10, wherein said forming step includes forming dots on the recording paper using ink jet heads.

17. Color picture forming method according to claim 16, wherein said ink jet heads can control the sizes of the droplets to be discharged therefrom.

18. Color picture forming method according to claim 14, wherein the size of the dither matrix of cyan is smaller than the sizes of the dither matrices of the other colors.

19. A color picture forming apparatus for reproducing an original color image, the apparatus comprising:
cyan dot forming means for depositing dots of cyan recording material, having $N_C$ plural concentrations, on a recording paper;
magenta dot forming means for depositing dots of magenta recording material, having $N_M$ plural concentrations, on the recording paper;
yellow dot forming means for depositing dots of yellow recording material, having $N_Y$ concentrations, on the recording paper;
cyan dot size control means for controlling the sizes of said magenta dots;
yellow dot size control means for controlling the sizes of said yellow dots; and
selecting means for selecting said cyan, magenta and yellow dot forming means and dot size control means to provide a plurality of dots of recording material concentrations, locations and sizes forming a color picture made up of a plurality of areas on the recording paper having optical densities in accordance with the optical densities of the original color image,
wherein the yellow, magenta and cyan recording materials enable representation of substantially all of the optical density gradations in the original color image and $N_C$, $N_M$ and $N_Y$ are integers and the relation among them is $N_Y < N_C$, $N_M$.

20. A color picture forming apparatus according to claim 19, wherein $N_C = N_M$.

21. A color picture forming apparatus according to claim 19, wherein $N_Y$ is two or less.

22. A color picture forming apparatus according to claim 19, wherein the optical density ranges reproducible using different dot sizes of the recording materials having a plurality of different concentrations overlap each other.

23. A color picture forming apparatus according to claim 11, wherein the lowest optical density capable of being reproduced using cyan is smaller than the lowest optical densities capable of being reproduced using of magenta and yellow.

24. A color picture forming apparatus according to claim 23, wherein, if the respective lowest optical densities capable of being reproduced by cyan, magenta and yellow are $ML_C$, $ML_M$ and $ML_Y$, the relation among said optical densities is $ML_C < ML_M < ML_Y$.

25. A color picture forming apparatus according to claim 19, wherein the minimum dot size for each color is the minimum size capable of being formed by said respective dot size control means.

26. A color picture forming apparatus according to claim 19, further including density modulating means for controlling the number of dots of each of cyan, magenta and yellow formed in any particular area of the picture.

27. A color picture forming apparatus according to claim 26, wherein said density modulating means includes a dither generator.

28. A color picture forming apparatus according to claim 19, wherein said dot forming means for each color includes an ink jet head.

29. A color picture forming apparatus for reproducing an original color image, the apparatus comprising:
yellow dot forming means for depositing yellow dots on a recording medium using yellow recording material;
magenta dot forming means for depositing magenta dots on the recording medium using plural concentrations of magenta recording material;
cyan dot forming means for depositing cyan dots on the recording medium using plural concentrations of cyan recording material
yellow density control means for controlling the optical density of the yellow dots by varying the dot size;
magenta density control means for controlling the optical density of the magenta dots by varying the dot size; and
cyan density control means for controlling the optical density of the cyan dots by varying the dot size;
selecting means for selecting said yellow; magenta and cyan dot forming means and density control means to provide a plurality of dots of recording material concentrations, locations and sizes forming a color picture made up of a plurality of areas on the recording paper having optical densities in accordance with the optical densities of the original color image,
wherein, if the optical densities capable of being expressed by said yellow, magenta and cyan recording material using the minimum dot sizes thereof are respectively $L_Y$, $L_M$ and $L_C$, the relation among said optical densities is $L_C < L_Y$.

30. A color picture forming apparatus according to claim 29, wherein the relation among $L_C$, $L_M$ and $L_Y$ is $L_C < L_M < L_Y$.

31. A color picture forming apparatus according to claim 29, further including density modulating means for controlling the number of dots to be formed in any particular area of the picture to provide optical densities not larger than $L_Y$, $L_M$ and $L_C$ in such area.

32. A color picture forming apparatus according to claim 31, wherein said density modulating means includes a dither generator.

33. A color picture forming apparatus according to claim 29, wherein said dot forming means for each of said colors includes an ink jet head for discharging ink droplets of each color.

34. A color picture forming apparatus according to claim 33, wherein said ink jet heads discharge ink droplets having different sizes in accordance with voltages applied thereto.

35. Color picture forming method for reproducing an original color image, the method comprising the steps of:
providing recording materials at least of yellow, magenta and cyan, at least magenta and cyan having recording materials of a plurality of different concentrations, which recording materials enable representation of substantially all of the optical density gradations in the original color image;
depositing the recording materials to provide a plurality of dots of different sizes on a recording medium; and
forming a color picture from the dots of different sizes and recording materials by selecting the recording material, size and location of each dot to provide a plurality of areas on the recording medium having optical densities in accordance with the optical densities of corresponding areas of the original color image,
wherein, if the number of different recording material concentrations for yellow, magenta and cyan are respectively $N_Y$, $N_M$ and $N_C$, the relation among said numbers is $N_M$, $N_C > N_Y$, and
wherein, if the optical densities capable of being expressed by said yellow, magenta and cyan recording materials using the minimum dot sizes thereof are respectively $L_Y$, $L_M$ and $L_C$, the relation among said optical densities is $L_C < L_Y$.

36. Color picture forming method according to claim 35, wherein the optical density ranges reproducible using different dot sizes of at least one recording material provided in a plurality of concentrations overlap each other.

37. Color picture forming method according to claim 35, further including a density modulation step controlling the number of recording materials in any particular area of the picture to provide optical densities not larger than $L_Y$, $L_M$ and $L_C$ in such area.

38. Color picture forming method according to claim 37, wherein said density modulation step uses a dither method.

39. Color picture forming method according to claim 35, wherein said forming step includes forming dots on recording paper using ink jet heads.

40. Color picture forming method according to claim 39, wherein said ink jet heads can control the sizes of the droplets to be discharged therefrom.

41. A color picture forming apparatus for reproducing an original color image, the apparatus comprising:
yellow dot forming means for depositing yellow dots on a recording medium;
magenta dot forming means for depositing magenta dots on the recording medium;
cyan dot forming means for depositing cyan dots on the recording medium;
yellow density control means for controlling the optical density of the yellow dots by varying the dot size;
magenta density control means for controlling the optical density of the magenta dots by varying the dot size; and
cyan density control means for controlling the optical density of the cyan dots by varying the dot size,
wherein at least said magenta dot forming means and said cyan dot forming means each comprises a plurality of dot forming units, said plurality of dot forming units being capable of reproducing different optical density ranges by depositing dots using recording materials of different concentrations, and if the numbers of different said dot forming units for cyan, magenta and yellow are respectively $N_C$, $N_M$ and $N_Y$, the relation among said numbers is $N_M$, $N_C > N_Y$.

42. A color picture forming apparatus comprising:
magenta dot forming means for depositing magenta dots of different sizes using a plurality of recording materials which have $N_M$ different concentrations in order to enable representation of substantially all of the optical density gradations of the magenta components of the color picture;
cyan dot forming means for depositing cyan dots of different sizes using a plurality of recording materials which have $N_C$ different concentrations in order to enable representation of substantially all of the optical density gradations of the cyan components of the color picture;
yellow dot forming means for depositing yellow dots of different sizes using a plurality of recording materials which have a plurality of $N_Y$ different concentrations in order to enable representation of substantially all of the optical density gradations of the yellow components of the color picture;
signal generating means for generating recording color signals of magenta, cyan and yellow; and
control means for controlling the dot size and recording material concentration provided by each of said dot forming means according to each of the recording color signals,
wherein the relation among $N_M$, $N_C$ and $N_Y$ is $N_M$, $N_C > N_Y$.

43. A color picture forming apparatus according to claim 42, wherein each of said dot forming means has a dot forming portion for each different recording materials.

44. A color picture forming apparatus according to claim 43, wherein each of said dot forming portions comprises an ink jet head, wherein an ink of one concentration corresponds to said ink jet head.

45. A color picture forming apparatus according to claim 42, further comprising means for changing dot sizes in each of said dot forming means according to the recording color signals.

46. A color picture forming apparatus according to claim 42, further comprising black dot forming means for depositing black dots wherein a recording material of one concentration is used for black.

47. A method for recording a color image by using cyan, magenta and yellow liquid colorants, wherein at least the cyan or magenta colorant each comprises colorants of a number of concentrations, comprising the step of:
forming dots of at least one of the liquid colorants in unit areas of the image; and controlling the concentration level of each unit area; wherein $N_C$, $N_M$ and $N_Y$ represent the number of concentrations of the cyan, magenta and yellow colorants, respectively, and are selected to satisfy the relation $N_M, N_C > N_Y$.

48. A method for recording a color image according to claim 47, wherein said forming step includes forming dots in particular patterns and, in said controlling step, the concentration level for each unit area is controlled by changing the particular pattern of dots to be formed.

49. A method for recording a color image according to claim 47, wherein said forming step includes forming a number of dots and, in said controlling step, the concentration level for each unit area is controlled by using a dither technique to change the number of dots to be formed.

50. A method for recording a color image according to claim 47, wherein $N_Y$ is one.

51. A method for recording a color image according to claim 47, wherein each unit area comprises a plurality of cells and either one dot or no dot of one concentration of each colorant is formed in any given cell.

52. A method for recording a color image according to claim 47, wherein said forming said dots are formed on a recording medium by droplets emitted by droplet emitting means.

53. A method for recording a color image according to claim 52, wherein said droplet emitting means comprises a number of heads for emitting droplets of colorants of different concentrations and colors, and $N_{HC}$, $N_{HM}$ and $N_{HY}$ represent the number of heads for emitting droplets for cyan, magenta and yellow colorants, respectively, and are selected to satisfy the relation $N_{HC}, N_{NM} > N_{NH}$.

54. A color picture forming apparatus comprising:
yellow, magenta and cyan dot forming means for forming yellow, magenta and cyan dots, respectively;
yellow, magenta and cyan density control means for varying the reflection optical density of yellow, magenta and cyan, respectively; and
limiting means for limiting the lowest optical density of the dot size for cyan to less than that for yellow.

55. A color picture forming apparatus according to claim 54, wherein said dot forming means for each of yellow, magenta and cyan comprises an ink jet head.

56. A color picture forming apparatus according to claim 55, wherein each said ink jet head discharges ink droplets having different dot sizes in accordance with a voltage applied thereto.

57. A color picture forming apparatus according to claim 54, wherein said cyan dot forming means is arranged for using a plurality of colorants of different concentrations greater in number than the number of colorants used by said yellow dot forming means.

58. A color picture forming apparatus according to claim 54, wherein said magenta dot forming means is arranged for using a plurality of colorants of different concentrations greater in number than the number of colorants used by said yellow dot forming means.

59. A color picture forming apparatus comprising:
yellow, magenta and cyan dot forming means for forming yellow, magenta and cyan dots, respectively;
yellow, magenta and cyan density control means for varying the reflection optical density of yellow, magenta and cyan, respectively; and
limiting means for limiting the lowest optical density of the dot size for cyan to less than that for magenta.

60. A color picture forming apparatus according to claim 59, wherein said dot forming means for each of yellow, magenta and cyan comprises an ink jet head.

61. A color picture forming apparatus according to claim 60, wherein each said ink jet head discharges ink droplets having different dot sizes in accordance with a voltage applied thereto.

62. A color picture forming apparatus according to claim 59, wherein said cyan dot forming means is arranged for using a plurality of colorants of different concentrations greater in number than the number of colorants used by said yellow dot forming means.

63. A color picture forming apparatus according to claim 59, wherein said magenta dot forming means is arranged for using a plurality of colorants of different concentrations greater in number than the number of colorants used by said yellow dot forming means.

64. A color picture forming apparatus comprising:
yellow, magenta and cyan dot forming means for forming yellow, magenta and cyan dots, respectively;
yellow, magenta and cyan density control means for varying the reflection optical density of yellow, magenta and cyan, respectively; and
limiting means for limiting the lowest optical density of the dot size for cyan to less than those for magenta and yellow.

65. A color picture forming apparatus according to claim 64, wherein said dot forming means for each of yellow, magenta and cyan comprises an ink jet head.

66. A color picture forming apparatus according to claim 65, wherein each said ink jet head discharges ink droplets having different dot sizes in accordance with a voltage applied thereto.

67. A color picture forming apparatus according to claim 64, wherein said cyan dot forming means is arranged for using a plurality of colorants of different concentrations greater in number that the number of colorants used by said yellow dot forming means.

68. A color picture forming apparatus according to claim 64, wherein said magenta dot forming means is arranged for using a plurality of colorants of different concentrations greater in number than the number of colorants used by said yellow dot forming means.

69. A color picture forming apparatus according to claim 64, wherein said limiting means is operable to limit the lowest optical density of the minimum dot size for yellow to greater than those for cyan and magenta.

* * * * *

UNITED STATES PATENT AND TRADEMARK OFFICE
CERTIFICATE OF CORRECTION

PATENT NO. : 4,959,659

DATED : September 25, 1990

INVENTOR(S) : SASAKI ET AL.

Page 1 of 4

It is certified that error appears in the above-identified patent and that said Letters Patent is hereby corrected as shown below:

TITLE PAGE:
AT [56] REFERENCES CITED

"52-11712 7/1975 Japan." should read --52-11712 1/1975 Japan.--.

COLUMN 1

Line 8, "Mar. 1, 1984now" should read --Mar. 1, 1984 now--.
Line 44, "on the contrary" should be deleted.

COLUMN 2

Line 18, "yellow more" should read --yellow is more--.

COLUMN 3

Line 32, "dot" should read --dot diameters--.
Line 55, "relation" should read --relations--.

COLUMN 4

Line 9, "into" should read --at--.
Line 46, "An such as" should read --As such an--.

COLUMN 5

Line 51, "of of densities" should read --of densities of--.

UNITED STATES PATENT AND TRADEMARK OFFICE
CERTIFICATE OF CORRECTION

PATENT NO. : 4,959,659
DATED : September 25, 1990
INVENTOR(S) : SASAKI ET AL.

Page 2 of 4

It is certified that error appears in the above-identified patent and that said Letters Patent is hereby corrected as shown below:

COLUMN 6

Line 21 "other hand, the" should read --the other hand--.

COLUMN 9

Line 1, "above" should read --above,--.
    Line 4, "into" should read --at--.
    Line 17, "into" should read --at--.
    Line 18, "into" should read --at--.
    Line 46, "into" should reat --at--.
    Line 47, "into" should read --at--.
    Line 60, "claim" should read --claims--.

COLUMN 10

Line 20, "or" should read --of--.
    Line 24, "of magenta" should read --magenta--.
    Line 52, "recording material" should read --recording materials--.

COLUMN 11

Line 49, "said magenta dots;" should read --said cyan dots;

magenta dot size control means for controlling the size of said magenta dots;--.

UNITED STATES PATENT AND TRADEMARK OFFICE
CERTIFICATE OF CORRECTION

PATENT NO. : 4,959,659
DATED : September 25, 1990
INVENTOR(S) : SASAKI ET AL.

Page 3 of 4

It is certified that error appears in the above-identified patent and that said Letters Patent is hereby corrected as shown below:

COLUMN 12

Line 7, "claim 11," should read --claim 19,--.
Line 9, "using of" should read --using--.
Line 50, "yellow;" should read --yellow,--.
Line 60, "material" should read --materials--.
Line 65, "$L_{C<LM}<L_Y$." should read --$L_C<L_M<L_Y$.--.

COLUMN 13

Line 33, "number" should read --numbers--.

COLUMN 14

Line 18, "$N_M, N_C>_{NY}$." should read --$N_M, N_C>N_Y$.--.
Line 49, "als." should read --al.--.

COLUMN 15

Line 25, "wherein said" should read --wherein in said--.
Line 33, "droplets for" should read --droplets of--.
Line 35, "$N_{HC}, N_{NM}>N_{NH}$." should read --$N_{HC}, N_{HM}>N_{HY}$.--.

UNITED STATES PATENT AND TRADEMARK OFFICE
CERTIFICATE OF CORRECTION

PATENT NO. : 4,959,659
DATED : September 25, 1990
INVENTOR(S) : SASAKI, ET AL.

It is certified that error appears in the above-identified patent and that said Letters Patent is hereby corrected as shown below:

<u>COLUMN 16</u>

Line 50, "that" should read --than--.

Signed and Sealed this

Twenty-eighth Day of September, 1993

Attest:

BRUCE LEHMAN

Attesting Officer

Commissioner of Patents and Trademarks